United States Patent
Thayer et al.

(10) Patent No.: US 7,099,994 B2
(45) Date of Patent: Aug. 29, 2006

(54) RAID MEMORY SYSTEM

(75) Inventors: Larry Thayer, Fort Collins, CO (US); Eric McCutcheon Rentschler, Fort Collins, CO (US); Michael Kennard Tayler, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 10/674,262

(22) Filed: Sep. 29, 2003

(65) Prior Publication Data

US 2005/0071554 A1   Mar. 31, 2005

(51) Int. Cl.
G06F 12/00    (2006.01)

(52) U.S. Cl. ........................ 711/114; 711/157

(58) Field of Classification Search ............... None
See application file for complete search history.

(56) References Cited

U.S. PATENT DOCUMENTS

| | | | |
|---|---|---|---|
| 5,859,965 A | | 1/1999 | Gittins et al. |
| 5,889,795 A | * | 3/1999 | Niijima et al. ............... 714/766 |
| 5,937,174 A | | 8/1999 | Weber |
| 5,953,352 A | | 9/1999 | Meyer |
| 5,978,958 A | * | 11/1999 | Tanaka et al. ................ 714/84 |
| 6,058,054 A | | 5/2000 | Islam et al. |
| 6,067,635 A | | 5/2000 | DeKoning et al. |
| 6,098,119 A | | 8/2000 | Surugucchi et al. |
| 6,151,659 A | | 11/2000 | Solomon et al. |
| 6,202,133 B1 | * | 3/2001 | Jeddeloh ................ 711/157 |
| 6,301,208 B1 | * | 10/2001 | Sugaya et al. ............. 369/47.1 |
| 6,311,251 B1 | | 10/2001 | Merritt et al. |
| 6,327,672 B1 | | 12/2001 | Wilner |
| 6,347,359 B1 | | 2/2002 | Smith et al. |
| 6,349,359 B1 | | 2/2002 | Gittins et al. |
| 6,397,366 B1 | * | 5/2002 | Tanaka et al. ............... 714/769 |
| 6,442,659 B1 | * | 8/2002 | Blumenau .................... 711/162 |
| 6,502,167 B1 | | 12/2002 | Tanaka et al. |
| 6,795,895 B1 | * | 9/2004 | Merkey et al. ............. 711/114 |
| 2003/0070043 A1 | * | 4/2003 | Merkey ..................... 711/114 |

OTHER PUBLICATIONS

Patterson et al.; "A Case for Redundant Arrays of Inexpensive Disks (RAID)"; 1988.
Advanced Computer and Network Corporation; "www.acnc.com"; printed Dec. 11, 2002.
USByte.com; "www.usbyte.com/common/raid_systems.htm"; printed Dec. 11, 2002.

* cited by examiner

*Primary Examiner*—Reginald G. Bragdon
*Assistant Examiner*—Daniel Ko

(57) ABSTRACT

Embodiments of the present invention are broadly directed to a memory system. In one embodiment, a first data memory is coupled to a first memory controller and a second data memory is coupled to a second memory controller. A parity memory is coupled to a parity controller, the parity controller being directly coupled to both the first memory controller and the second memory controller. Parity data control logic is configured to store and retrieve parity information associated with data stored in both the first data memory and the second data memory, the parity data control logic configured to interleave within the parity memory parity data associated with data stored in the first data memory with parity data associated with data stored in the second data memory.

17 Claims, 5 Drawing Sheets

RAID MEMORY SYSTEM

BACKGROUND

As is known, redundant array of inexpensive disks (RAID) is a technology used to improve the input/output performance and reliability of mass storage devices. A RAID array incorporates fault tolerance by using a redundant architecture, and the disk controller which controls a RAID array is called a RAID controller. In RAID systems, data is stored across multiple storage units (e.g., disks) in order to provide immediate access to the data despite the failure of one or more storage units.

Fundamental to RAID technology is "striping," which refers to a particular method of combining multiple storage units into one logical storage unit. Striping partitions the storage space of each drive into "stripes" that can be as small as one sector (512 bytes) or as large as megabytes. These stripes are then interleaved in a rotating sequence, so that the combined space is composed alternatively of stripes from each drive.

One major task of a RAID controller is to protect against data loss created by hardware failure. RAID controllers have been defined at different "levels" to provide different sets of features.

RAID Level 0, also referred to as RAID 0, consists of a stripe set that presents multiple disks as a single virtual disk whose capacity is equal to the sum of the capacities of the individual disks. The reliability of the stripe set is less than the reliability of its least reliable member. RAID 0 is not a true redundant controller because it provides no redundancy. However, its use of parallel transfer technology is a performance-oriented architecture that is inexpensive and therefore attractive to many low cost users.

RAID Level 1, also referred to as RAID 1, creates a virtual storage unit from a mirrored set of storage units. Mirroring is implemented on a pair of storage units that store duplicate data but appear to the computer as a single storage unit. Although striping is not used within a single mirrored storage-unit pair, multiple RAID 1 arrays can be striped together to create a single large array. RAID 1 provides high reliability.

RAID Level 2, also referred to as RAID 2, is a parallel access array that uses Hamming coding to provide error detection and correction capability to the array. This is an expensive approach and is not popularly used.

RAID Level 3, also referred to as RAID 3, is optimized for high data rates and is a parallel transfer technique with parity. Each data sector is subdivided, and data is scattered across all data storage units with redundant data being stored on a dedicated parity storage unit. As recognized by persons skilled in the art, reliability is much higher than a single storage unit.

RAID Level 4, also referred to as RAID 4, is similar to RAID 3 in certain respects. Redundant data is stored on an independent parity storage unit, similar to RAID 3. RAID 4 improves on the performance of a RAID 3 system with respect to random reading of small files by "uncoupling" the operation of the individual storage unit drive actuators, and reading and writing a larger minimum amount of data to each disk. This capability allows high I/O read rates but has moderate write rates. RAID 4 is suitable mainly for systems that are read intensive and do not require high data transfer rates.

RAID Level 5, also referred to as RAID 5, is an independent access array with rotating parity. Data sectors are distributed in the same manner as disk striping systems but redundant information is interspersed with user data across multiple array members rather than stored on a single parity storage unit as in RAID 3 or RAID 4 systems. This relieves the write bottleneck associated with RAID 4 controllers that use a single dedicated parity storage unit. RAID 5 arrays have high data reliability, good data transfer rates and high I/O rate capability.

The foregoing has generally described RAID systems in the disk drive market. However, as is known, RAID systems have expanded from the disk drive market into the semiconductor memory market. Thus, RAID systems are known to be implemented in silicon memory, as well as magnetic and optical drives. Reference is made to FIG. 1, which is a block diagram illustrating such a conventional RAID memory system.

As illustrated in FIG. 1, RAID memory systems that are known include a RAID memory controller 10 coupled to RAID memory 61 and parity memory 63, the RAID memory 61 may be any of a variety of types of memories, such as DRAM. Also, a commonly-referred to type of RAID memory is DIMM (dual inline memory module) memory. A host 102 and system bus 105 are also illustrated in FIG. 1. Information or data communicated between the host 102 and RAID memory 61 are communicated through the RAID memory controller 10. Internal to the RAID memory controller is logic for generating parity information for the data stored within the RAID memory 61. Details regarding the structure and operation of the system illustrated in FIG. 1 are well known, and need not be described herein. What is relevant for the purposes described herein is the vertical relationship between the host 102, the RAID memory controller 10, and the RAID memory 61. As the channel widths of the communication channels 72, 73, and 74 increase, the pin count on the RAID memory controller 10 increases as well. Due to fabrication costs, and as is known, this increased pin count can significantly drive up the component cost of the RAID memory controller 10.

Further, known memory RAID systems and solutions provide RAID at a memory controller level rather than a DIMM bus level. This, unfortunately, requires an additional level of hierarchy and additional chips and system complexity.

SUMMARY OF THE INVENTION

Accordingly, it is desired to provide a system that effectively addresses the foregoing and other shortcomings of prior art systems. In this regard, embodiments of the present invention are broadly directed to a memory system. In one embodiment, a first data memory is coupled to a first memory controller and a second data memory coupled to a second memory controller. A parity memory is coupled to a parity controller, the parity controller being directly coupled to both the first memory controller and the second memory controller. Parity data control logic is configured to store and retrieve parity information associated with data stored in both the first data memory and the second data memory, the parity data control logic configured to interleave, within the parity memory, parity data associated with data stored in the first data memory with parity data associated with data stored in the second data memory.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE PREFERRED EMBODIMENTS

As described herein, there are various aspects and embodiments of the present invention. In accordance with one embodiment, the present invention is directed to a unique RAID memory system.

Figure 1:
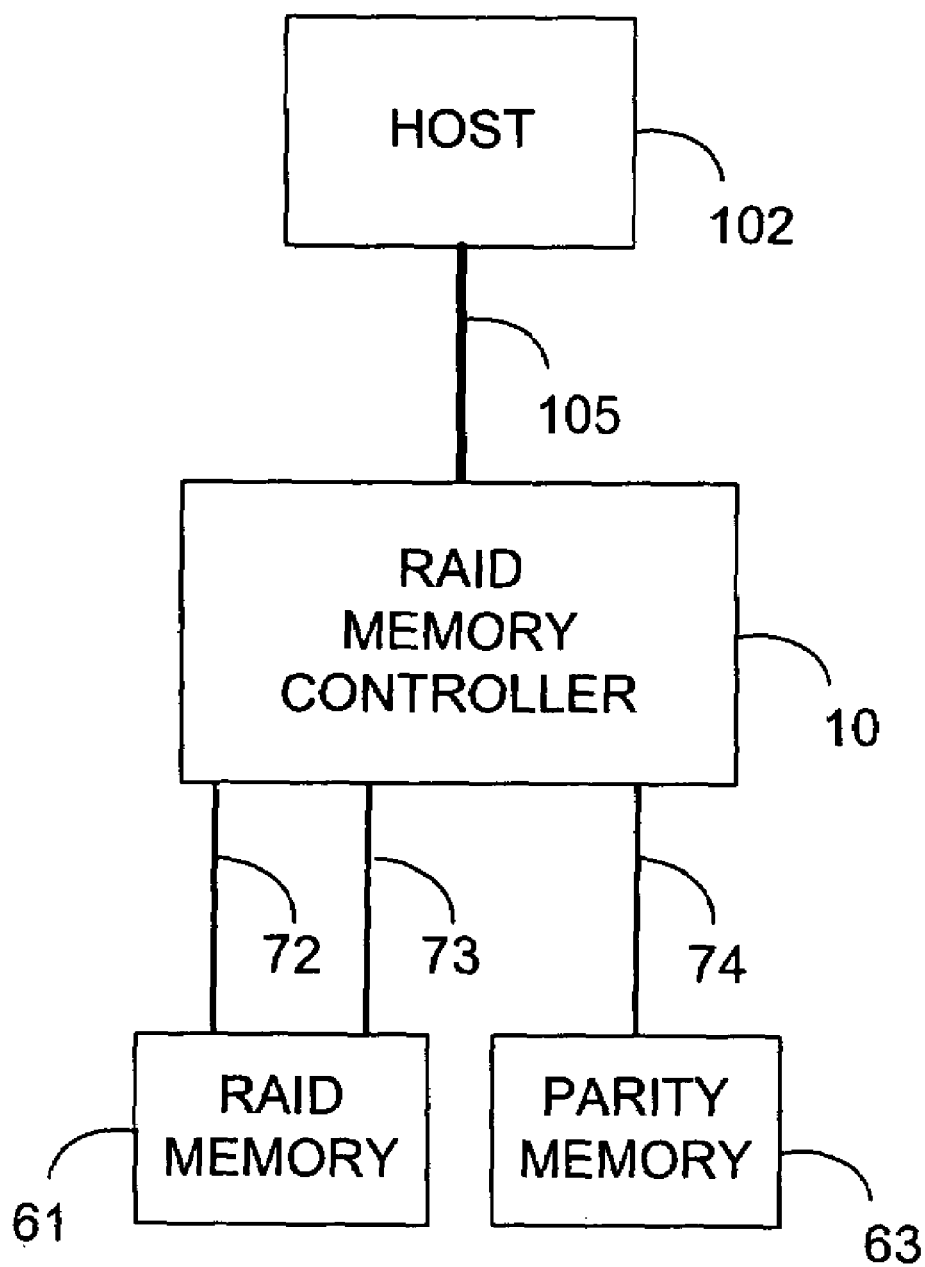
FIG. 1 is a block diagram illustrating a conventional RAID memory system, as is known in the art.
Figure 2:
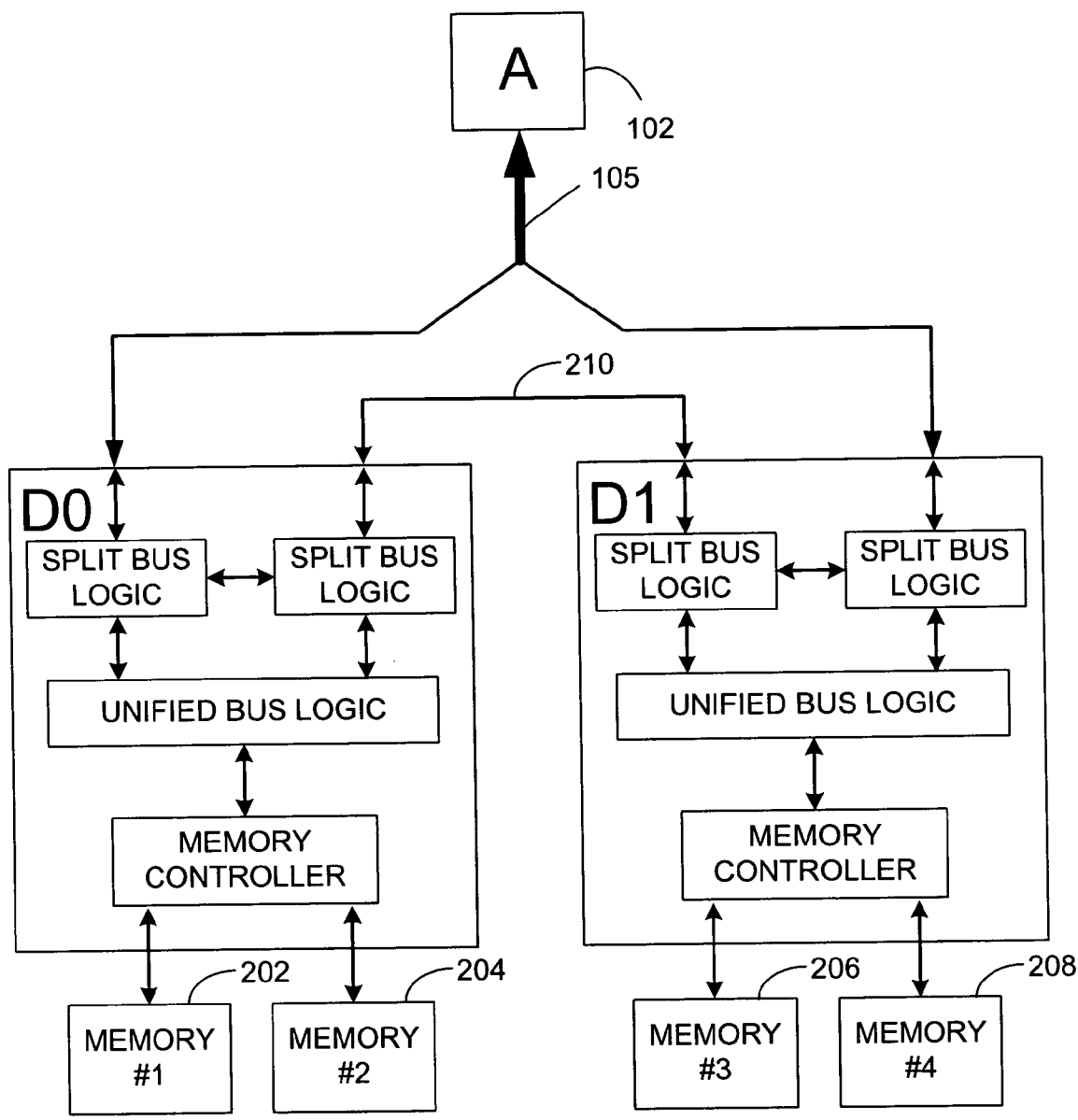
FIG. 2 is a diagram illustrating a memory system having two controller chips that communicate with a host agent over a split system bus.

Reference is now made to FIG. 2, which illustrates an embodiment of a system having cooperative memory controllers D0 and D1 that control data access to memories 202, 204, 206 and 208. One unique aspect of the system illustrated in FIG. 2 relates to the division of the system bus 105. In this regard, each memory controller D0 and D1 is directly coupled to only a portion of the system bus 105. A separate, inter-chip bus 210 provides for direct communication between controllers D0 and D1. Information communicated from the system bus 105 to chip D0 may be communicated, as needed, to chip D1 over this inter-chip bus 210. The embodiment of the system illustrated in FIG. 2, including the manner in which information is communicated among the various components illustrated therein, is fully described in co-pending U.S. patent application Ser. No. 10/630,460, entitled "Integrated circuit with a scalable high-bandwidth architecture," filed on Jul. 30, 2003. This co-pending application is incorporated herein by reference.

Figure 3:
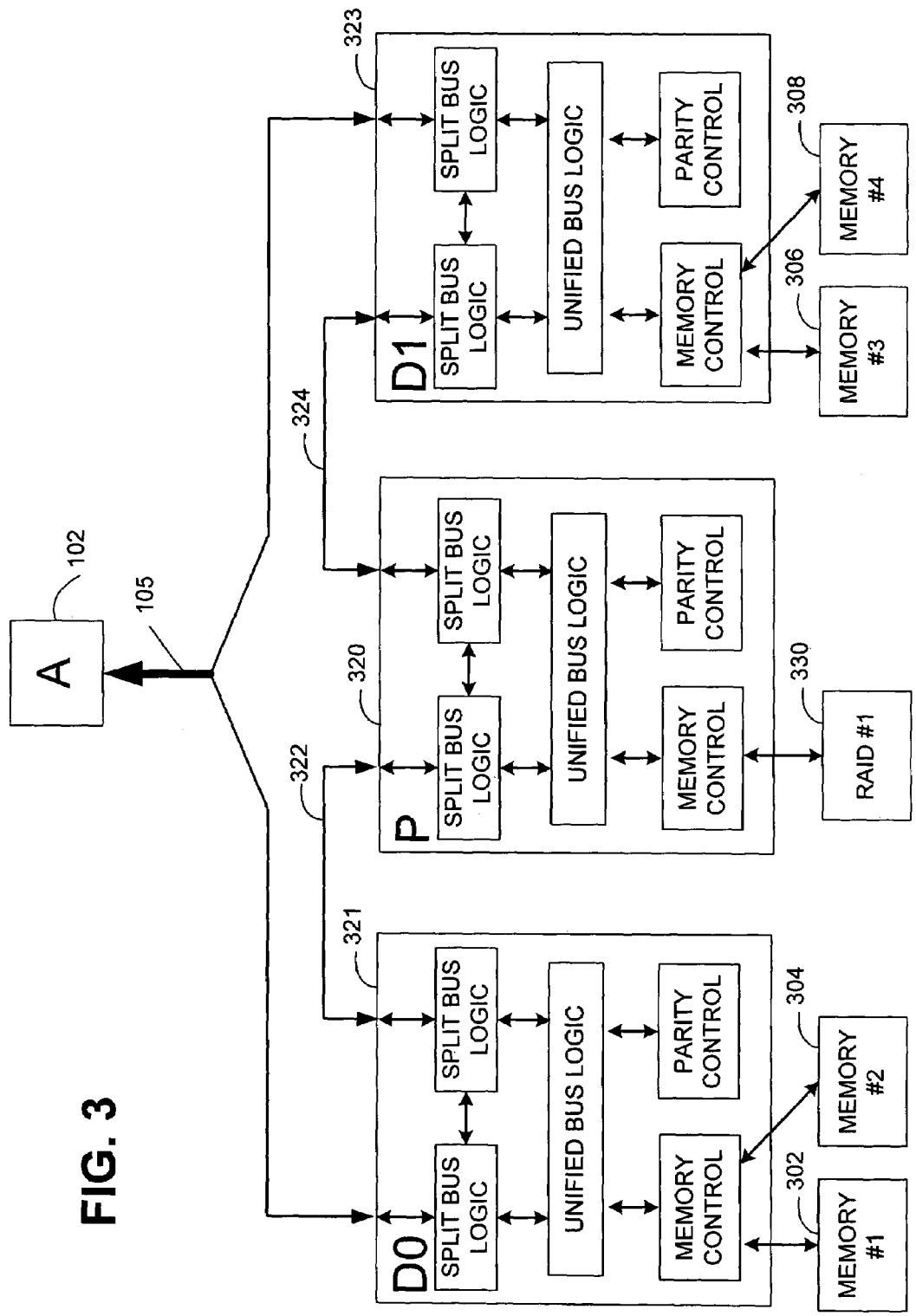
FIG. 3 is a diagram of a memory system similar to FIG. 2, but further including a parity controller and memory for storing parity information.

Reference is now made to FIG. 3, which illustrates an embodiment of a system that is an expansion of the system illustrated in FIG. 2. In this respect, the system illustrated in FIG. 3 is directed to a RAID memory system, in which two memory controller chips 321 and 323 intercommunicate with a host 102 over a split system bus 105, as described in connection with the embodiment of FIG. 2. In addition, a parity controller chip 320 is interposed between memory controller chips 321 and 323, and communicates with memory controller chips 321 and 323 via inter-chip communication links 322 and 324. A RAID memory 330 is coupled to the RAID memory control chip 320, and stores parity information associated with the data that is stored in the various data memories 302, 304, 306, and 308. The system illustrated in FIG. 3 is more fully described in co-pending application Ser. No. 10/632,199, entitled "Improved memory system and controller for same," filed Jul. 31, 2003. This co-pending application is incorporated herein by reference.

Figure 4:
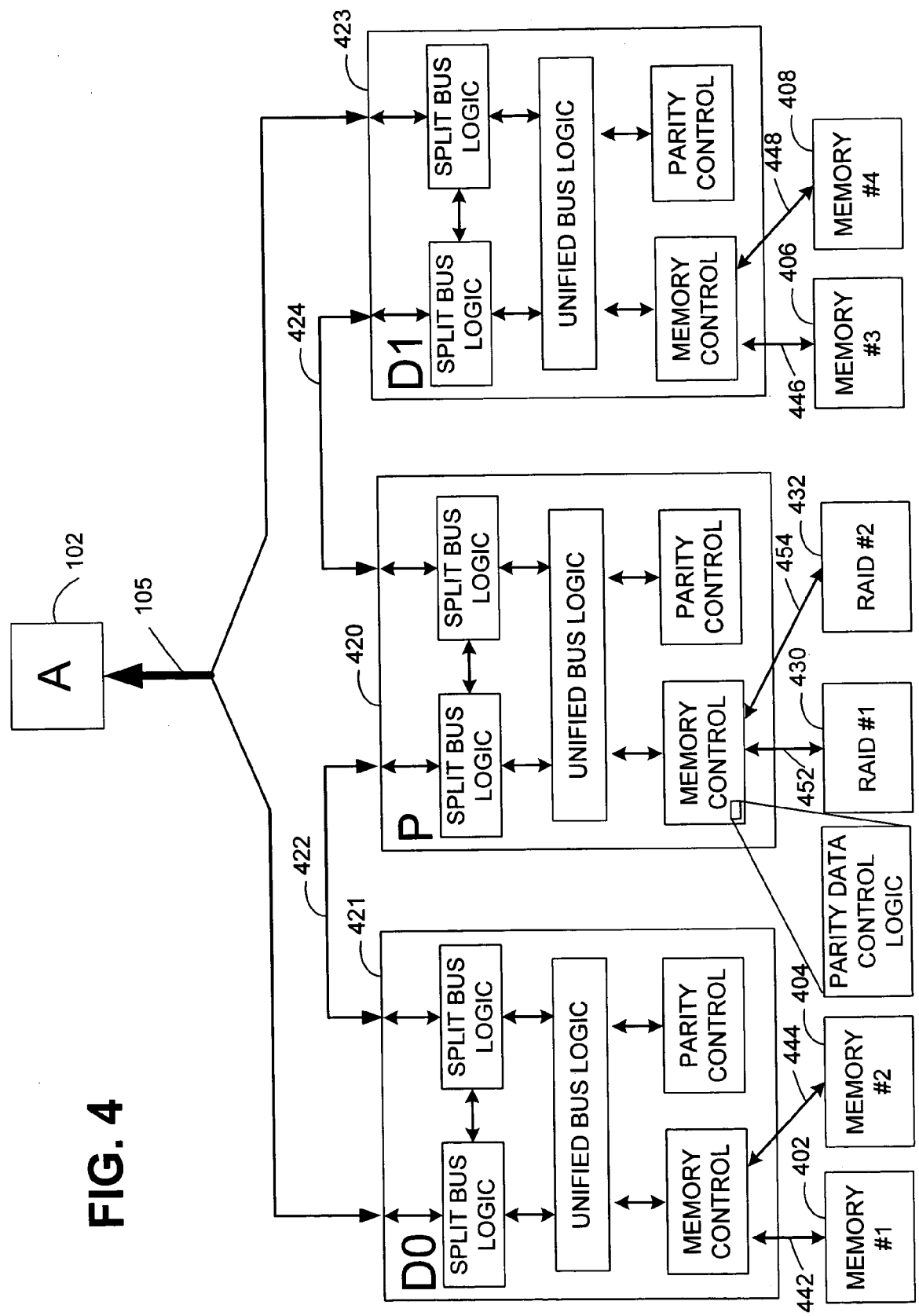
FIG. 4 is a diagram of a RAID memory system that interleaves parity information of data stored in data memories associated with two memory controllers.

Reference is now made to FIG. 4, which is a diagram illustrating an embodiment of the present invention. The embodiment of FIG. 4 is similar to the embodiment of FIG. 3, but illustrates two RAID memory components 430 and 432. In the embodiment of FIG. 4, two memory controllers 421 and 423 each operate independently and each is associated with two DIMM busses 442, 444, 446 and 448. The two memory controllers 421 and 423 intercommunicate with a parity controller 420, which is attached to two RAID memories 430 and 432 through DIMM busses 452 and 454. Depending upon the information being communicated, the controller chips 421, 423 and 420 may intercommunicate over the inter-chip links 422 and 424 to share data that comes to them, in order to facilitate proper operation of memory controllers 421 and 423. In this regard, if 423 receives information from system bus 105 that is needed by 421, then the information may be communicated to 421 via the inter-chip busses and parity controller P.

In one embodiment, memory controller 421 may perform RAID parity calculations on data to be stored in its associated memory 402 and 404, and communicate the resulting parity data to the RAID controller 420 for storage in its associated memory 430 and 432. Memory controller 423 may similarly perform RAID parity calculations on date stored in its associated memory 430 and 430, and communicate the resulting parity data to the RAID controller 420 for storage in its associated memory 430 and 432. In this embodiment, the RAID parity information received by controller 420 from the two independent controllers 421 and 423, is interleaved into the memories 430 and 432. Parity data control logic 460 is provided to manage the interleaving and control of the parity data storage in memories 430 and 432.

As is illustrated in FIG. 4, one additional DIMM bus 454 is provided, over that of the embodiment illustrated in FIG. 3. The embodiment of FIG. 4 is particularly suited for a RAID 3 memory system, wherein the resulting RAID parity data is one half the number of bytes contained in the original data. The embodiment of FIG. 4 may benefit from capitalization on an observation; namely that a read or write transaction in most memory subsystems is more than one byte in length. Thus, a read or write command to a memory device typically results in a read from or write to multiple memory multiple locations in the memory device. Since parity information in a RAID 3 memory system is one half the length of the original data, burst reads or writes to the parity memory are one half the length of the burst reads or writes of the original data. This facilitates the sharing of one parity controller between two RAID 3 memory controllers. By utilizing two DIMM busses 452 and 454 in connection with the RAID memory controller P, parity information for the original data stored in memories 402, 404, 406, and 408 may be stored in RAID memories 430 and 432.

It should be appreciated that the RAID controller 420 does not have two independent RAM busses, but rather DIMM busses 452 and 454 are configured to operate as one wide RAM bus. Structuring the system in this way, however, may create a difficulty of allowing 421 and 423 to independently access the parity RAM 430 and 432, when the controller 430 sees the busses 452 and 454 as one wide DIMM bus. The solution to this dilemma may be achieved by configuring the parity data control logic 460 to interleave the parity data on an address basis, as opposed to a per DIMM basis.

Figure 5:
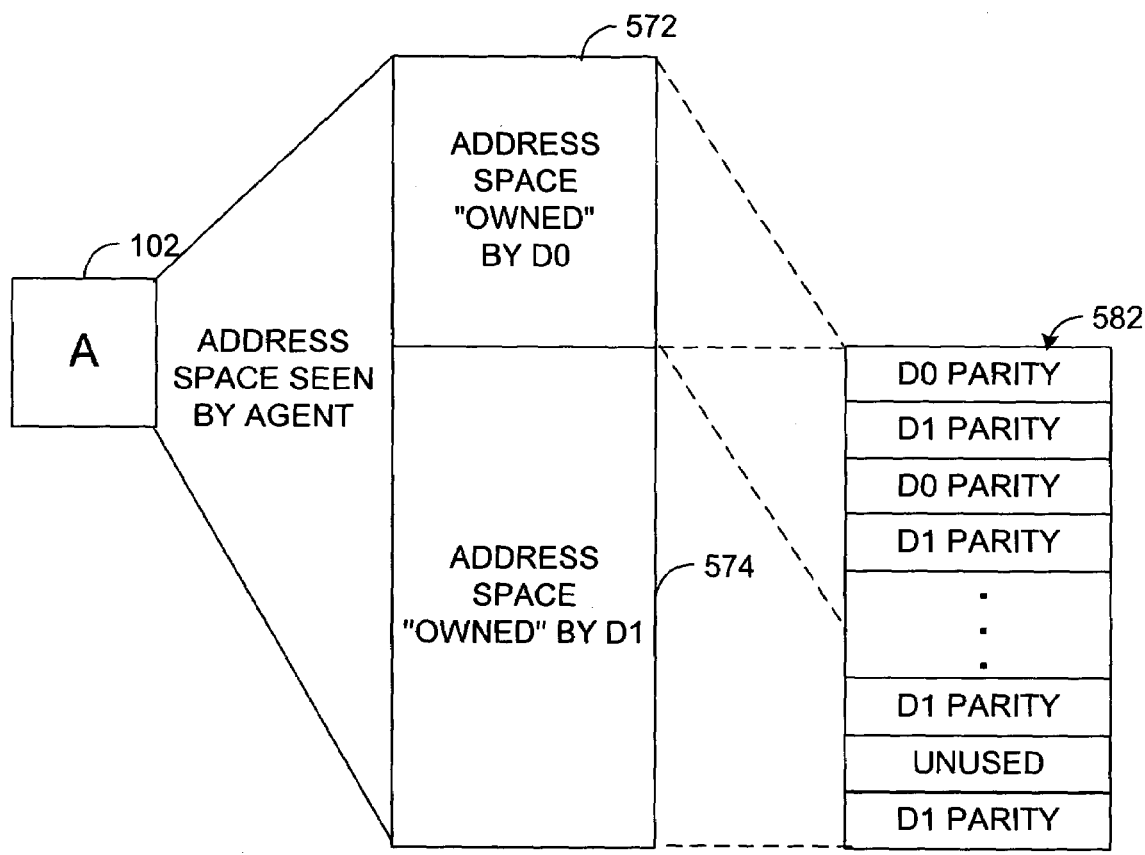
FIG. 5 is a diagram illustrating a manner in which parity information may be interleaved in a RAID memory of the system of FIG. 4.

In the embodiment of FIG. 4, like FIG. 3, the requesting agent 102 sees the various RAM devices 402, 404, 406, and 408 as a single memory domain. However, each of the memory controllers 421 and 423 of FIG. 4 operates independently, and the total memory address space may be split between the D controllers, based on control settings in their respective memory controller logic control registers (not shown). It should be appreciated, however, that the size of the RAID memory 430 and 432 is at least as large as the larger of the address space between the memory associated with 421 and memory associated with 423. This notion is illustrated in FIG. 5. As illustrated in FIG. 5, the agent chip 102 effectively "sees" the combined address space of that owned by D0 572 and that owned by D1 574. As illustrated by the larger block of 574, controller 423 is seen to possess the greater memory space. Accordingly, the parity memory illustrated by 582 is at least the same size as the memory space 574 owned by controller 423. The parity data control logic 460 (FIG. 4) operates to interleave the parity data in an alternative 421, D1, 421, D1, etc. fashion as illustrated in block 582 of FIG. 5. As further illustrated, near the bottom of the parity memory 582, the excess memory "slots" reserved for the parity information corresponding to the address space owned by 421 may be unused, if the 421 memory space is smaller than the D1 memory space.

In the embodiment illustrated in FIG. 3, parity data is written to the single parity memory across the single DIMM using burst lengths that were the same as the burst length for the read or write data transaction, since data was written and read over two DIMMs, while parity information was read or written over a single DIMM. In contrast, in the embodiment of FIG. 4, the same number of DIMMs are used to read and write parity information as is used to read and write data information. Therefore, only one half of the burst length is required to read and write parity information into the parity memory. By way of example, if the original data is accessed in a 128-byte transfer chunk (e.g., 128 byte DMA), the seven LSBs of the address (data within the 128-byte chunk) may be don't care values, by virtue of the manner in which DMA transfers are managed. The parity data, being only one half the length, is accessed in 64-byte chunks, thus the six least significant bits may be don't care values. The parity data control logic 460 may interleave the parity data by simply inserting a zero into the seventh bit position of the address associated with original read and write transactions that fall within controller's 421 portion of the memory domain, while inserting a one into the seventh bit of the address, if the transaction falls within controller's 423 portion of the address domain. Managing the addressing using the 7$^{th}$ bit position in this way results in an interleaving of parity information. By interleaving the parity information in this way, parity data may be retrieved from the parity memory at the same time that the corresponding original data is retrieved from the data memory of the respective memory controller 421 or 423.

In both FIG. 3 and FIG. 4, the requesting agent (processor for example) sees the memory controlled by the two data memory control chips as one unified domain. In this regard, details of how the memory is actually controlled and accessed are hidden from the agent. The agent can't distinguish between a single controller having a large memory domain and two controllers each having a smaller domain.

A difference between the systems of FIG. 3 and FIG. 4 is in how the two memory controllers interact and share the memory space. In FIG. 3, the RAID algorithm has controller 421 and 423 operate in lock step, and has each have an identical, memory configuration. The two controllers actually operate as though there was one controller with a four DIMM bus wide memory subsystem. In this setup, an end user adds or removes memory in five DIMM sets (four memory and one parity), which is undesirable for some users. The RAID algorithm represented in FIG. 4 breaks the requirement to have the two controllers in lock step, which is one benefit of this approach. Each controller can have a completely independent memory subsystem, address space, address decoding settings etc. The end user can add or remove memory in 2 DIMM pairs provided that the requirement of having at least as much RAM in the parity subsystem as exists in the larger of the two controller's subsystems is met. Although this approach results in more parity RAM, it increases the flexibility for the end user to add or remove RAM in smaller increments.

By way of further explanation, a write transaction sequence may occur as follows. The parity controller 420 may be programmed to recognize addresses over a full address space as seen by the agent 102 (see FIG. 5). The memory controllers 421 and 423 may control independent (and potentially disparate) portions of the address space. The agent 102 may send a write request and write data over the system bus 105. The unified bus logic within each controller chip reconstructs (e.g., by passing data to each other over inter-chip links) the write transaction and data from the split bus 105. Each of the memory controllers 423 and 421 claim (e.g., assume control) of the write transactions that fall within their respective address space and issue a write command to the address received with the write transaction. The parity controller 420 calculates parity data for every write transaction sent to either of the D controllers based on the write data, appends a one or a zero to the seventh bit of the address space received with the write transaction (as described above), and issues a write of one half the burst length required by the original data to the modified address. This operation of the parity controller 420 stores the parity data in the appropriate memory 430 and 432.

Similarly, with respect to a read transaction sequence, the parity controller 420 is programmed to recognize addresses over the full space as seen by the agent 102. The memory controllers 421 and 423 may control independent portions of the address space. The agent 102 may send a read request over the split bus 105, and unified bus logic within the controller chips reconstructs the read transaction from the split bus. The memory controllers 421 and 423 claim the transactions that fall within their respective address space and issue an appropriate read command to the address received with the read transaction. The appropriate memory controller 423 or 421 issues a read command to its memory devices with the address received with the read transaction. The parity controller appends a one or a zero to the seventh bit of the address (as described above), issues a read command to its memory devices with one half the burst length required by the original data to the modified address. The memory controllers 421 and 423 and the parity controller 420 each receive read data or parity data from their respective memory devices. The parity controller 420 forwards the appropriate parity data to the respective D controller(s) that was targeted by the original read transaction over an inter-chip bus 422 or 424. The parity control logic within the targeted D controller further performs a parity check and correct operation, and the memory controller chip(s) 421 and 423 collectively issue a read return to the agent chip 102 with corrected read data through the unified bus logic.

The foregoing has illustrated the invention in the context of RAID memory systems. However, it should be appreciated that the invention may have applicability in non-RAID memory systems as well. Again, since there are a wide variety of particular functional and system variations, implementation-specific details need not be provided herein as such details will often be driven by design objectives and tradeoffs, and are within the level of skill possessed by one of ordinary skill in the art.

What is claimed is:

1. A memory system comprising:
   a host integrated circuit;
   a first memory controller having at least one associated memory defining a first address space;
   a second memory controller having at least one associated memory defining a second address space;
   a parity memory for storing parity information associated with data stored in the memories associated with the first and second memory controllers; and
   a controller for the storing data in the parity memory, the controller configured to store parity data associated with data stored in the memory associated with the first memory controller in an interleaved fashion with data stored in the memory associated with the second memory controller.

2. The memory system of claim 1, wherein the memory system is a RAID memory system.

3. The memory system of claim 1, wherein the memory system is a RAID 3 memory system.

4. The memory system of claim 1, wherein the first and second memory controllers are capable of being configured to define the first and second address spaces to be non-overlapping.

5. The memory system of claim 1, wherein an address bit is appended to a plurality of address bits used to store and retrieve parity information in the parity memory, wherein the appended address bit is set to a first value when storing and retrieving parity information associated with the first memory controller and the appended address bit is set to a second value when storing and retrieving parity information associated with the second memory controller.

6. The memory system of claim 1, wherein the memory associated with the first memory controller and the memory associated with the second memory controller are different sizes.

7. The memory system of claim 1, wherein the parity memory is at least as large as the larger of the memory associated with the first memory controller and the memory associated with the second memory controller.

8. The memory system of claim 1, wherein there are two memory busses associated with the first memory controller, two memory busses associated with the second memory controller, and two parity memory busses.

9. A memory system comprising:
   first data memory coupled to a first memory controller;
   second data memory coupled to a second memory controller;
   a parity memory coupled to a parity controller, the parity controller being directly coupled to both the first memory controller and the second memory controller;
   parity data control logic configured to store and retrieve parity information associated with data stored in both the first data memory and the second data memory, the parity data control logic configured to interleave within the parity memory parity data associated with data stored in the first data memory with parity data associated with data stored in the second data memory.

10. The memory system of claim 9, wherein the memory system is a RAID memory system.

11. The memory system of claim 9, wherein the first and second memory controllers are capable of being configured to define the first and second address spaces to be non-overlapping.

12. The memory system of claim 9, wherein an address bit is appended to a plurality of address bits used to store and retrieve parity information in the parity memory, wherein the appended address bit is set to a first value when storing and retrieving parity information associated with the first memory controller and the appended address bit is set to a second value when storing and retrieving parity information associated with the second memory controller.

13. The memory system of claim 9, wherein the memory associated with the first memory controller and the memory associated with the second memory controller are different sizes.

14. The memory system of claim 9, wherein the parity memory is at least as large as the larger of the memory associated with the first memory controller and the memory associated with the second memory controller.

15. The memory system of claim 9, wherein there are two memory busses associated with the first memory controller, two memory busses associated with the second memory controller, and two parity memory busses.

16. A method for managing parity information associated with a plurality of memory controllers comprising:
   generating first parity information associated with data to be stored in a first data memory coupled to a first memory controller;
   generating second parity information associated with data to be stored in a second data memory coupled to a second memory controller;
   storing the first and second parity information in a parity memory coupled to a parity controller, the first and second parity information being stored in an interleaved fashion within the parity memory.

17. The method of claim 16, wherein storing the first and second parity information more specifically includes managing an address bit of the parity memory, such that the address bit is in one state with storing parity information generated by the first memory controller and the address bit is in a second state when storing parity information generated by the second memory controller.

* * * * *